United States Patent
Jacobs et al.

(10) Patent No.: US 8,411,324 B2
(45) Date of Patent: Apr. 2, 2013

(54) SELECTION OF EXPOSURE INTENSITY AND CLEANING FIELD INTENSITY SETPOINTS FOR OPTIMUM LINE WIDTH USING SENSOR READING

(75) Inventors: Paul L. Jacobs, Webster, NY (US); W. Bradford Willard, Fairport, NY (US); Brian R. Conrow, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 616 days.

(21) Appl. No.: 12/699,361

(22) Filed: Feb. 3, 2010

(65) Prior Publication Data
US 2011/0188087 A1 Aug. 4, 2011

(51) Int. Cl.
*H04N 1/40* (2006.01)
*B41J 2/47* (2006.01)
*G03G 15/00* (2006.01)

(52) U.S. Cl. ...... 358/3.01; 358/1.9; 358/3.02; 358/3.21; 358/501; 358/534; 347/19; 347/115; 347/118; 347/240; 399/49; 399/72; 399/78

(58) Field of Classification Search .......... None
See application file for complete search history.

(56) References Cited

U.S. PATENT DOCUMENTS

| 5,170,257 | A | * | 12/1992 | Burns | 358/3.21 |
| 5,450,502 | A | * | 9/1995 | Eschbach et al. | 382/169 |
| 5,802,214 | A | * | 9/1998 | Eschbach et al. | 382/254 |
| 6,819,352 | B2 | * | 11/2004 | Mizes et al. | 347/240 |
| 7,090,324 | B2 | * | 8/2006 | Mizes | 347/19 |
| 7,095,531 | B2 | * | 8/2006 | Mizes et al. | 358/1.9 |
| 7,116,842 | B2 | * | 10/2006 | Daigi | 382/300 |
| 7,125,094 | B2 | * | 10/2006 | Mizes | 347/19 |
| 2006/0285764 | A1 | * | 12/2006 | Xu et al. | 382/258 |

* cited by examiner

*Primary Examiner* — Steven Kau
(74) *Attorney, Agent, or Firm* — Oliff & Berridge, PLC

(57) ABSTRACT

Line width of images marked by an image marking device is adjusted by reading a calibration patch marked by the marking device, and then adjusting one or more settings of the marking device, such as exposure intensity or cleaning field intensity, independent of the digital control of the tone reproduction curve so that the line width of subsequently marked images becomes closer to a target value. A digital control may be implemented to compensate for the impact of the modification of the one or more settings on the tone reproduction curve.

7 Claims, 3 Drawing Sheets

SELECTION OF EXPOSURE INTENSITY AND CLEANING FIELD INTENSITY SETPOINTS FOR OPTIMUM LINE WIDTH USING SENSOR READING

BACKGROUND

This disclosure relates to adjusting device settings that affect line width based on a sensor reading of a calibration patch during a setup routine.

Many factors affect the appearance of text produced by image marking devices such as photocopiers and printers. These factors include line width, that is, the thickness of lines marked by the image marking devices. The line width of lines marked by an image marking device particularly affects the appearance of duplicated characters such as text, especially in the case of non-Romanized characters such as kanji. When the line width appears too thick or too thin, the impression of the quality of the image marking device is diminished.

SUMMARY

Exposure intensity (e.g., the power of a laser or other light source that exposes selected areas of a photosensitive substrate in a xerographic marking apparatus) and cleaning field intensity (e.g., the strength of the electric field in the non-image areas) are parameters that affect line width. Conventionally, some image marking devices, such as photocopiers, adjust exposure intensity and/or cleaning field intensity continuously during print runs to compensate for machine parameters that vary with time, e.g., ambient temperature and humidity. Alternatively, some image marking devices, such as photocopiers, use a fixed exposure intensity and/or cleaning field intensity, which are infrequently adjusted in response to machine parameters that vary with time, e.g., ambient temperature and humidity. Control of the tone reproduction curve during print runs is maintained digitally through a control loop that manipulates the digital halftone file used in imaging the tone reproduction curve. In instances where the tone reproduction curve is controlled digitally, it may be desirable to set the exposure intensity and cleaning field intensity optimally for line width based on some indicator of line width independent of the impact on the tone reproduction curve. The impact of exposure intensity and cleaning field intensity on the tone reproduction curve is compensated for by the digital control. This setting could be done once, e.g., at initial setup of the device, or at various points during the life of the device, e.g., periodically at regular intervals or at the time of replacement of various print engine components. The setting could compensate for unique features of the machine, e.g., the gap between the photosensitive roll and the donor roll.

Using exactly the same parameters for every device during initial setup at the factory is not desirable, because there may be variations between machines, even within the same model, because of manufacturing tolerances or the like. It would be useful to have a way to adjust parameters that affect line width, on a device-by-device basis, as appropriate, by reading a calibration patch marked by each respective device.

One aspect includes a method that adjusts an image marking device that marks an image on a substrate. The method includes reading a calibration patch by a sensor marked on the substrate by the image marking device, determining a target line width, calculating an estimated line width based on the reading of the calibration patch by the sensor, comparing the estimated line width with the determined target line width, and modifying one or more parameters of the marking device so that the estimated line width becomes closer to the determined target line width.

Another aspect includes an image marking device that marks an image on a substrate. The image marking device comprises a sensor that reads a calibration patch marked on the substrate by the image marking device, a target unit that determines a target line width, a calculating unit that calculates an estimated line width based on the reading of the calibration patch by the sensor, a comparing unit that compares the calculated estimated line width with the determined target line width, and an adjusting unit that modifies modifying one or more parameters of the marking device so that the calculated estimated line width becomes closer to the determined target line width.

DETAILED DESCRIPTION OF EMBODIMENTS

This disclosure is directed to a method and device for adjusting line width for an image marking device during a setup routine using a calibration patch marked by the marking device and read by a sensor.

Figure 1:
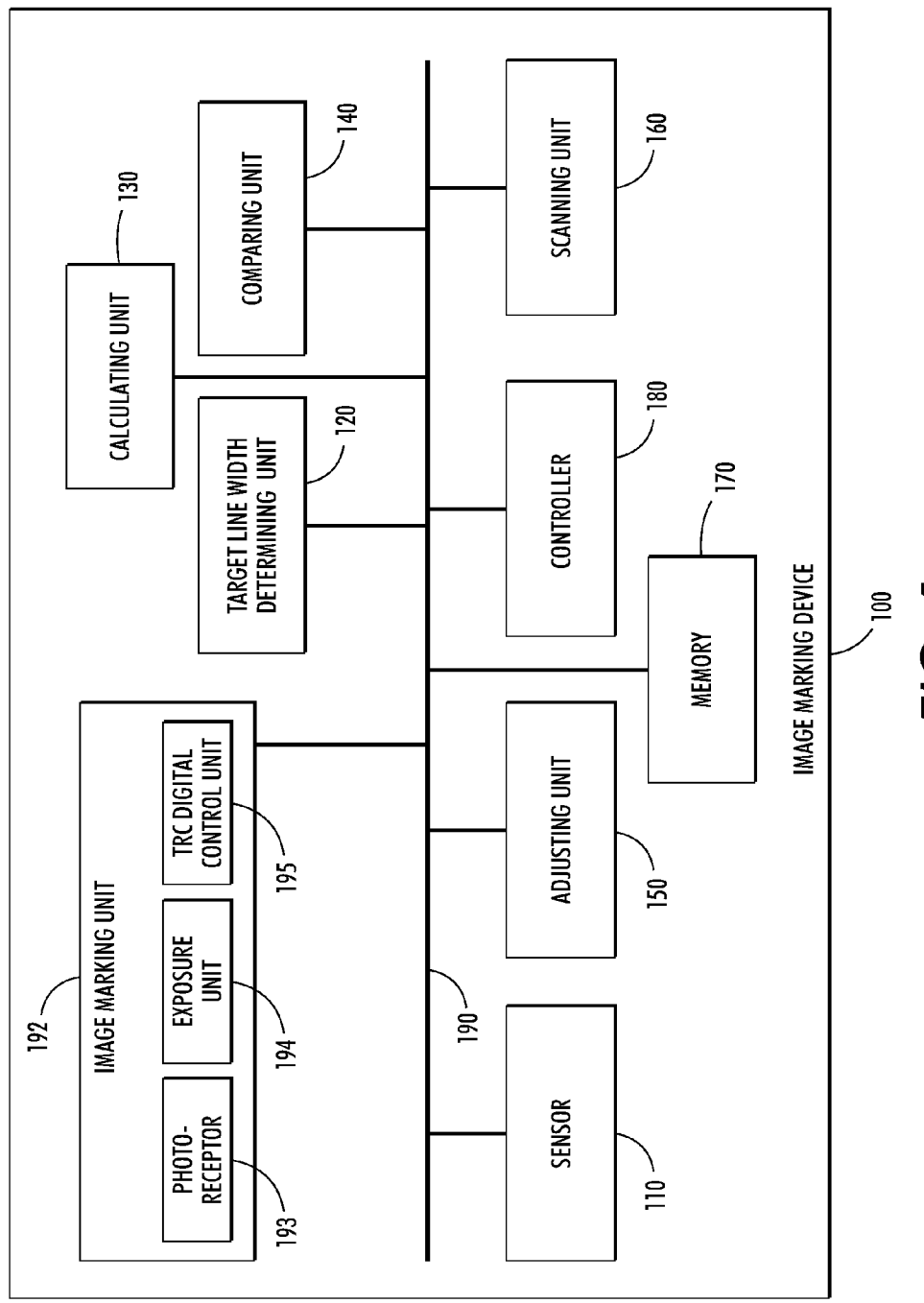
FIG. 1 is a diagram of an image marking device in which line width is adjusted based on the reading of a calibration patch.

FIG. 1 discloses an image marking device 100 including a sensor 110, a target line width determining unit 120, a calculating unit 130, a comparing unit 140, an adjusting unit 150, a memory 170 and an image marking unit 192. The image marking device 100 may include a scanning unit 160 if the image marking device is capable of scanning in an image, such as in the case of a photocopier. Otherwise, a separate image source (not shown) may be connected to the image marking device 100 via a suitable link (not shown). The image source could be a digital camera, a separate scanner, or a locally or remotely located computer that, e.g., includes a word processing program and/or document creation program or the like, or any other known or later developed device that is capable of generating electronic image data. Similarly, the image data source could be any suitable device that stores and/or transmits electronic image data, such as a client or a server of a network. The link could thus be or include any known or later developed wired, wireless or optical device for transmitting the electronic image data from the image data source to the marking system 100. The sensor 110, the target line width determining unit 120, the comparing unit 130, the calculating unit 140, the adjusting unit 150, the scanning unit 160 and memory 170 are linked together as necessary by a bus 190 and controlled by the controller 180.

For example, the image marking device 100 may be a xerographic copier or a xerographic printer. The image marking device 100 applies an image to print media by using the image marking unit 192. The image marking unit 192 in this embodiment includes a charge retentive surface, such as a surface of a photoreceptor 193, an exposure unit 194, such as a laser, LED light bar, or other controllable light source, and a tone reproduction curve digital control unit 195. These elements are common to xerographic devices, and their structure and operation are well known to those skilled in the art. The photoreceptor 193 may be in the form of a continuous belt formed of a flexible material, or a drum. The exposure unit 194 is disposed adjacent the photoreceptor 193 for charging the surface of the photoreceptor 193. The tone reproduction curve digital control unit 195 digitally controls a tone reproduction curve that is used, in known fashion, to reproduce an image. Although shown as part of the image marking unit 192, the tone reproduction curve digital control unit 195 may alternatively be separate from the image marking unit 192, and be connected directly to the bus 190. When settings such as exposure intensity and cleaning field intensity are changed, as described below, the impact of the changes in these settings on the tone reproduction curve may be digitally compensated for by the tone reproduction curve digital control unit 195, or by another entity such as the controller 180.

The image scanned by the scanner 160 may be temporarily stored in memory 170 before being sent to the image marking unit 192. The memory 170 may serve as a buffer for information coming into or going out of the marking system 100, may store any necessary programs and/or data for implementing the functions of the marking system 100, such as a program for causing a computer to implement the exemplary methods described below, and/or may store data at various stages of processing. Furthermore, it should be appreciated that the memory 170, while depicted as a single entity, may actually be distributed. Alterable portions of the memory 170 are, in various exemplary embodiments, implemented using static or dynamic RAM. However, the memory 170 can also be implemented using a floppy disk and disk drive, a writeable optical disk and disk drive, a hard drive, flash memory or the like. The generally static portions of the memory 170 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The sensor 110 enables measurement of one or more calibration patches (not shown) marked by the image marking device 100. Each calibration patch may have a predetermined density, dot pattern or line pattern. The exact form of the calibration patches is determined in advance by the entity that performs the calibrations. Some patches may give better indications of line width than others, and it is advisable to use such patches in performing the adjustments described below. The reading of the calibration patch aids adjustment of various parameters of the image marking device 100, as described in more detail below. In this embodiment, the sensor is shown connected to the bus 190, as a permanent part of the image marking device 100. With this configuration, a closed-loop adjustment is possible, in which the marking device 100 marks the patch, the sensor 110 reads the patch and outputs a signal to the controller 180, and the controller 180 performs an appropriate adjustment. However, an open-loop configuration is also possible, in which the sensor 110 is separate from the image marking device 100, and a technician operates the sensor, reads the output, and manually inputs an appropriate adjustment to the image marking device via an interface (not shown) connected to the bus 190.

To begin the initialization process (also referred to as "set up routine") for the image marking device 100, the sensor 110 reads the calibration patch after the image marking unit 100 marks the calibration patch. More than one patch may be used for the initialization process, and/or a patch may be read multiple times by the sensor and an average value of the readings used, but a single patch and single reading will be referred to hereafter occasionally, for convenience. After the calibration patch is read by the sensor 110, the sensor output is sent to the calculating unit 130, which calculates from that output an estimated line width that will result under the current setup of the image marking device 100. For example, a lower reflectance, as measured by the sensor, corresponds with a larger estimated line width. The calculating unit 130 may compare the sensor readings of the calibration patch with a predetermined calibration curve that has been developed by, for example, marking a plurality of different patches on a substrate and then reading them with the sensor to develop the calibration curve. It will be appreciated by those skilled in the art that, instead of marking the patches on print media, the patches may be laid out as toner on photoreceptor, and the sensor may read them directly from the photoreceptor. In this example, the sensor 110 measures reflectance, and outputs a value indicating the reflectance of the calibration patch. Multiple calculations may be performed on the same sensor output, or the calculations may be performed based on multiple sensor readings by the calculating unit.

Before the image marking device adjusts the exposure intensity and the cleaning field intensity, sensor readings are analyzed and may then be compared to one or more predetermined calibration curves, obtained as described above. The cleaning field intensity corresponds to the potential difference between the photoreceptor 193 and development system (not shown). The cleaning field intensity may be adjusted by adjusting a set point for a control loop associated with controlling the cleaning field intensity. The manufacturer may have determined, in advance, relationships between the exposure intensity and the cleaning field intensity, and the estimated line width values. The resulting corresponding line width value may be obtained from a comparison with the calibration curves. Each calibration curve may be represented by a formula, for example, $y=mx+c$ (straight line), or a lookup table (LUT) where the lookup table correlates reflectance with line width. The lookup table may be derived from prior analysis of an equivalent image marking device under a variety of environmental conditions. Different calibration curves may correspond to different parameters that affect line width. For example, one calibration curve may correspond to the cleaning field intensity, and another calibration curve may correspond to the exposure intensity. Alternatively, a single, combined-effect curve may be generated, indicating the combined effect of cleaning field intensity and exposure intensity. This determined line width value based on the calibration patch reading is the estimated line width value.

The image marking device 100 may also include a target line width determining unit 120 that determines the target line width. Alternatively, the image marking device 100 may have stored in the memory 170 a preset target line width value (e.g. factory default) that is simply retrieved for comparison with the estimated line width value from memory. This configurable value or default line width value is the target line width value. The target line width value may be fixed or adjustable.

The comparing unit 140 compares the estimated actual line width value and the target line width value. If the estimated actual line width value does not match the target line width value within a predetermined tolerance, then the adjusting unit 150 may adjust one or more settings of the image marking device to achieve a closer match between the estimated actual line width value and the target line width value. Specifically, for example, the adjustment unit 150 may adjust the exposure intensity (e.g., laser power) of the exposure unit 194 and/or the cleaning field intensity. Control of the tone reproduction curve during print runs is maintained digitally through a control loop that manipulates the digital halftone file used in imaging the tone reproduction curve. However, it may be desirable to set the exposure intensity and cleaning field intensity optimally for line width based on some indicator of line width where the tone reproduction curve is maintained independent of the setting of the exposure intensity and cleaning field intensity by digital control.

This setup routine may be run more than one time to ensure better accuracy in attaining the target line width value (that is, it may be performed in various iterations, with each subsequent iteration achieving better accuracy than the one before). After an acceptable target line width value is achieved, the routine is exited.

It will be understood that the units shown in FIG. 1, e.g., the target line width determining unit 120, the calculating unit 130, the comparing unit 140, that adjusting unit 150, routines associated with the image marking unit 192 and/or scanning unit 150, and the controller 180, or portions of any of these, can be implemented in software in a suitably programmed general purpose computer. Alternatively, any or all of the units shown in FIG. 1 can be implemented as physically distinct hardware circuits within an ASIC, or using a FPGA, a PDL, a PLA or a PAL, or using discrete logic elements or discrete circuit elements. The particular form each of the units shown in FIG. 1 will take is a design choice and will be obvious and predictable to those skilled in the art.

Figure 2:
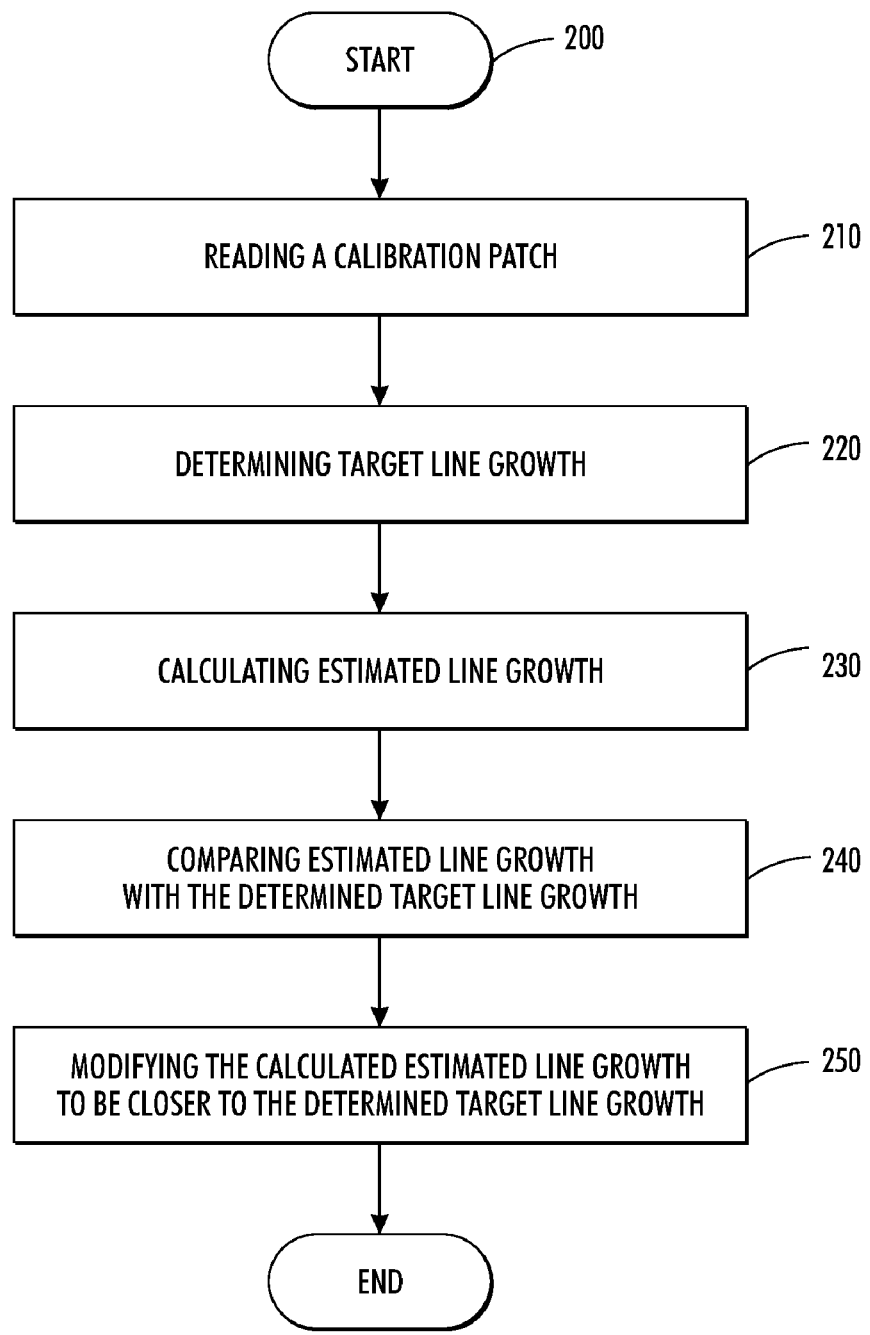
FIG. 2 is a flowchart of a method for adjusting line width based on reading of a calibration patch.

FIG. 2 illustrates a flow chart 200 illustrating a method for adjusting an image marking device 100 that marks an image on a substrate based on the following steps. In step 210, a sensor reads a calibration patch 110 that was marked on the substrate by an image marking device. In step 220, a target line width is determined. In step 230, an estimated line width for the image marking device is calculated based on the reading of the calibration patch by the sensor. In step 240, the calculated estimated line width is compared with the determined target line width. In step 250, one or more settings of the image marking device, such as cleaning field and exposure intensity, are adjusted so that the calculated estimated line width better matches the determined target line width without adjusting the tone reproduction curve. When settings such as exposure intensity and cleaning field intensity are changed, as described below, the impact of the changes in these settings on the tone reproduction curve may be digitally compensated for. After step 250, the method is finished.

Figure 3:
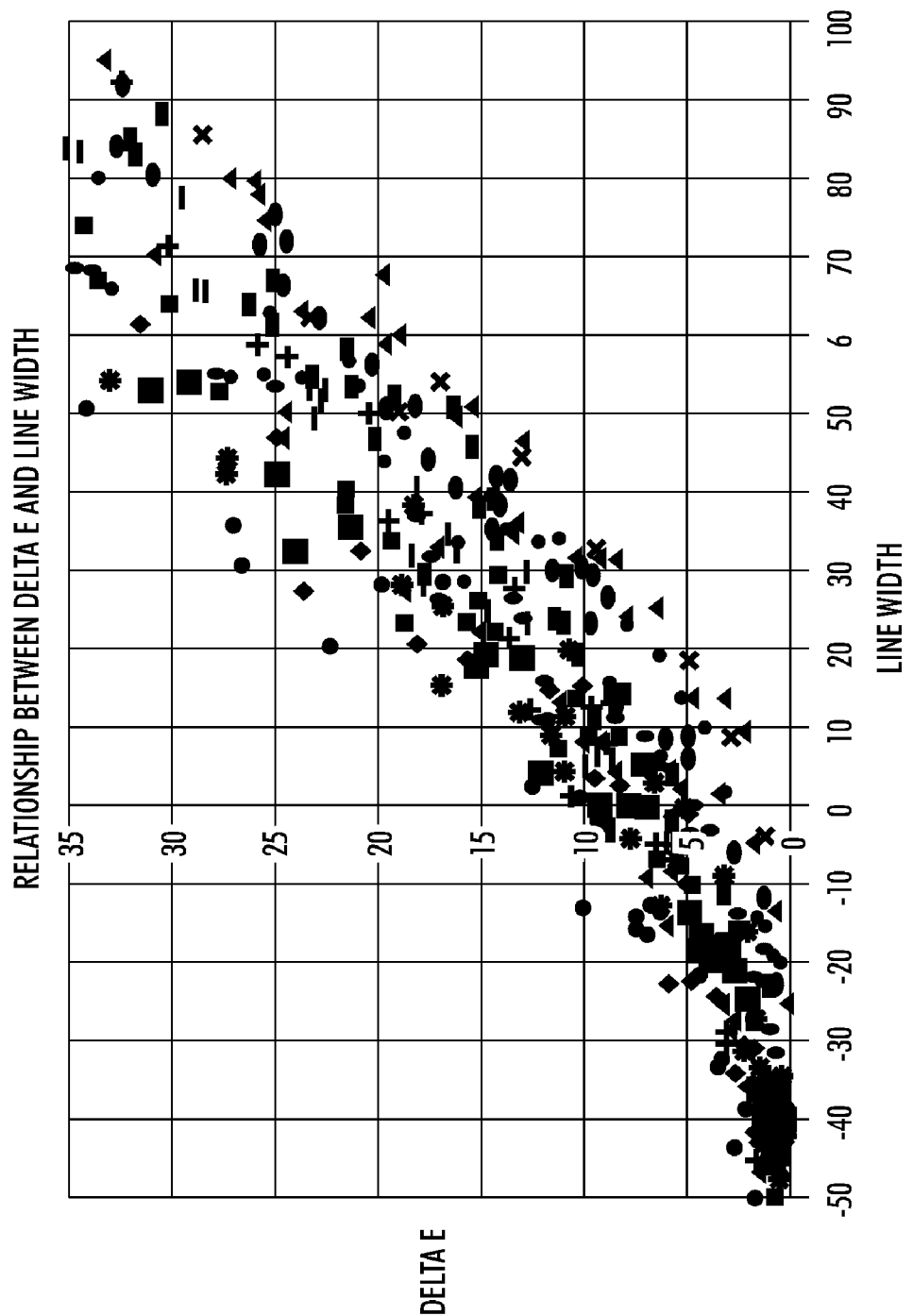
FIG. 3 illustrates an example of a graph showing a relationship between the value of parameters read from a calibration patch and the measured line width value of an image marking device.

FIG. 3 illustrates an example of a graph showing the relationship between the value of parameters read from a calibration patch and the measured line width value output by an image marking device based on actual measurements. In particular, FIG. 3 illustrates the relationship between delta E and measured line width. The X-axis represents the line width in microns, and the Y-axis represents delta E. A sensor measured the reflectance of a calibration patch. The measured reflectance inversely correlates with delta E. As delta E increases, the measured line width also increases.

The method described may be embodied in software stored as a list of instructions on a computer readable medium and when the computer readable medium is read by a computer and the instructions are executed then the method described above can be performed.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An image marking device that marks an image on a substrate based on a tone reproduction curve, the image marking device comprising:
    a control unit that digitally controls the tone reproduction curve;
    a sensor that reads a calibration patch marked on the substrate by the image marking device;
    a target unit that determines a target line width for images that will be marked on print media by the image marking device;
    a calculating unit that calculates an estimated line width for images that will be marked on print media by the image marking device, based on the reading of the calibration patch by the sensor;
    a comparing unit that compares the calculated estimated line width with the determined target line width; and
    an adjusting unit that modifies one or more settings of the image marking device so that the calculated estimated line width becomes closer to the determined target line width, wherein
    the control unit implements a digital correction that compensates for impact of the modification of the one or more settings on the tone reproduction curve, the digital correction maintains the tone reproduction curve independently from the one or more settings, and
    the one or more settings include any of exposure intensity and cleaning field intensity.

2. The image marking device according to claim 1, wherein the calibration patch includes any of a halftone pitch, a predetermined density, a predetermined dot pattern or a predetermined line pattern.

3. The image marking device according to claim 1, wherein the sensor measures reflectance of the calibration patch.

4. The image marking device according to claim 1, wherein the image marking device is a xerographic marking device.

5. A method that adjusts an image marking device that marks on image on a substrate based on a tone reproduction curve, the method comprising:
    digitally controlling the tone reproduction curve;
    reading, by a sensor, a calibration patch marked on the substrate by the image marking device;
    determining a target line width;
    calculating an estimated line width based on the reading of the calibration patch by the sensor;
    comparing the calculated estimated line width with the determined target line width; and
    modifying one or more settings of the image marking device so that the calculated estimated line width becomes closer to the determined target line width, and
    implementing a digital correction in the digital control to compensate for impact of the modification of the one or more settings on the tone reproduction curve, wherein
    the digital correction maintains the tone reproduction curve independently from the one or more settings, and
    the one or more settings include any of exposure intensity and cleaning field intensity.

6. The method according to claim 5, wherein the calibration patch includes any of a halftone pitch, a predetermined density, a predetermined dot pattern and a predetermined line pattern.

7. The method according to claim 5, wherein the sensor measures reflectance of the calibration patch.

* * * * *